Oct. 19, 1971 J. F. UHL 3,613,215
PROCESS FOR COLLECTING WASTE MATERIALS
Filed June 16, 1970 2 Sheets-Sheet 1

INVENTOR:
JAMES F. UHL
By Parrott, Bell, Seltzer, Park & Gibson
ATTORNEYS

Oct. 19, 1971                J. F. UHL                3,613,215
                  PROCESS FOR COLLECTING WASTE MATERIALS
Filed June 16, 1970                                  2 Sheets-Sheet 2
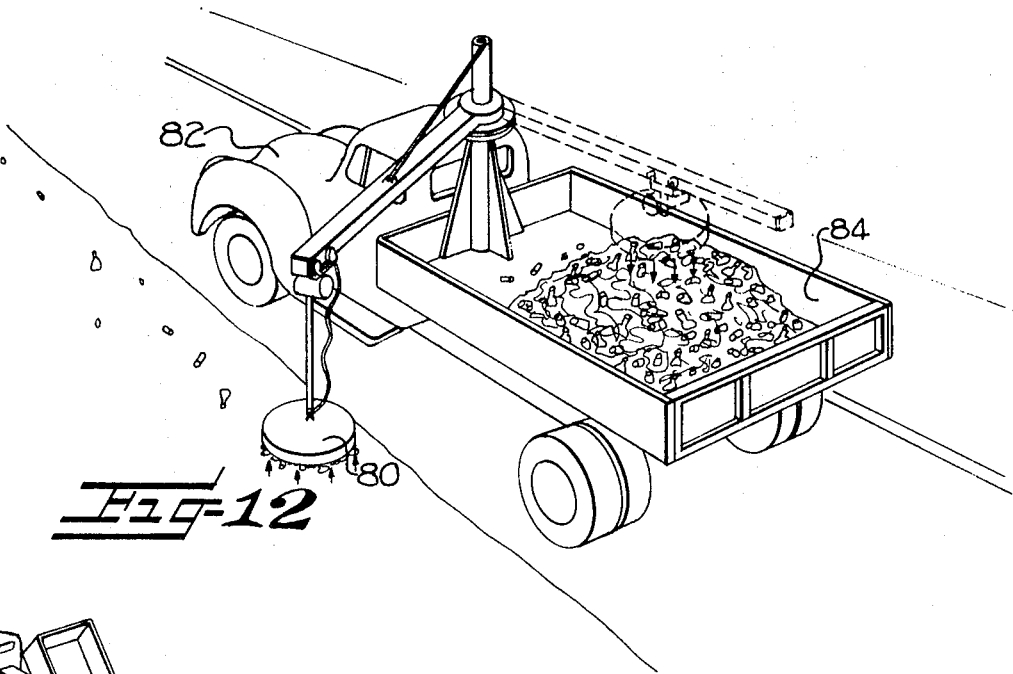
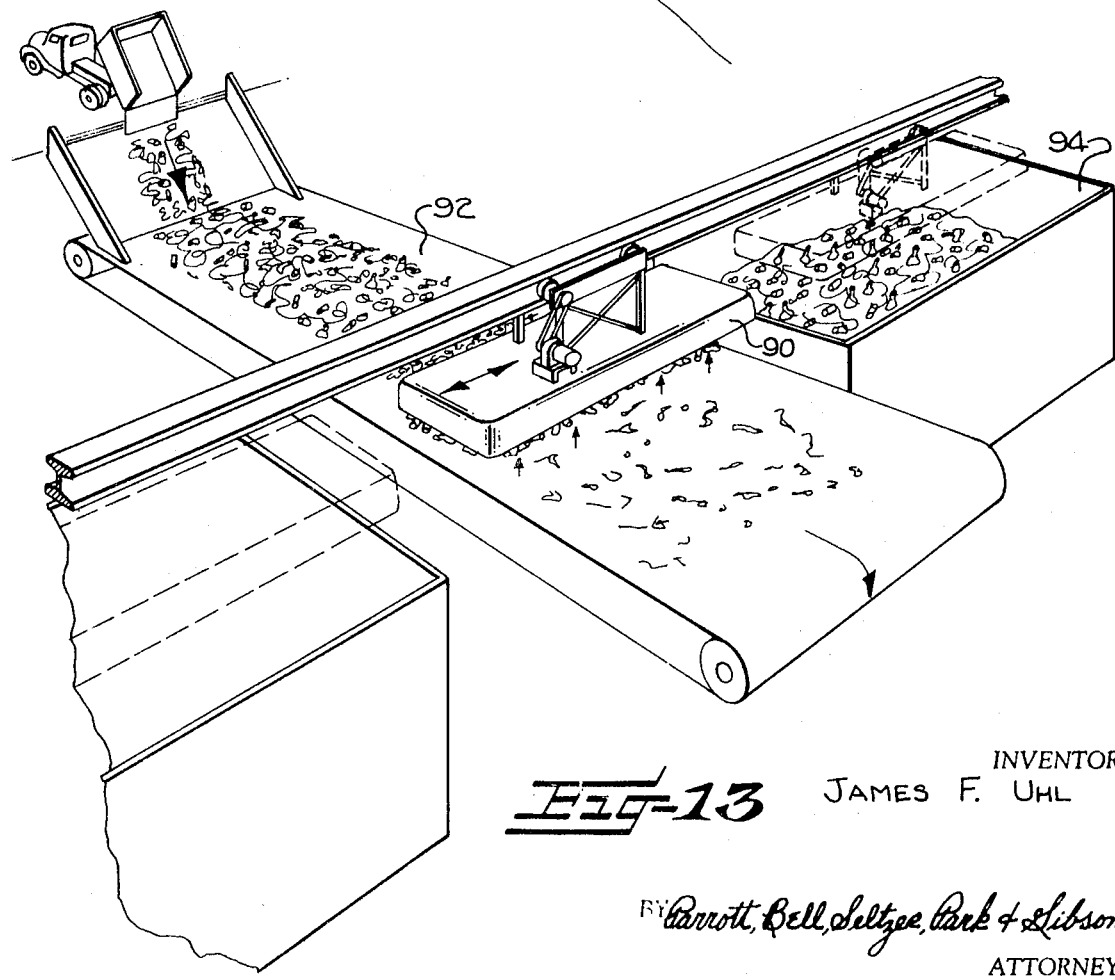
INVENTOR:
JAMES F. UHL

United States Patent Office 3,613,215
Patented Oct. 19, 1971

3,613,215
PROCESS FOR COLLECTING WASTE MATERIALS
James F. Uhl, P.O. Box 11065, Charlotte, N.C. 28209
Filed June 16, 1970, Ser. No. 46,722
Int. Cl. B23g 17/00; B23p 19/00; B23q 7/00
U.S. Cl. 29—403           10 Claims

ABSTRACT OF THE DISCLOSURE

A process for collecting and removing waste or litter in the form of non-magnetic containers, wherein a sufficient quantity of a magnetically attractive material has been assembled with the container to permit the same to be moved or lifted by a magnetic field. If the container is deposited as waste or litter in a public place by the consumer, it may then be moved or lifted by a magnet into a suitable receptacle for proper disposal. Reuseable materials collected in this manner may then be separated from non-reuseable materials, and recycled into new products.

---

The present invention relates to a process for collecting used non-magnetic containers such as aluminum cans, glass or plastic bottles, or the like, from areas where they have been deposited as waste or litter.

In recent years, the use of aluminum containers in the packaging of beer and soft drinks has become popular since such containers are attractive in appearance, have a low incidence of food contamination, and are easily opened by the consumer. However, aluminum containers have presented a waste disposal problem since they are essentially non-deteriorating and thus tend to collect and remain as unsightly litter along highways, beaches, and parks. In addition, aluminum is relatively expensive, and it is therefore desirable to recycle or salvage the used aluminum cans to the extent they can be easily collected.

The use of non-returnable glass or plastic bottles and jars has also increased in recent years, and has further contributed to the problem of litter and waste removal. Since there is no economic reward for returning or properly disposing of these bottles, they are often inadvertently discarded to result in litter in public places.

The present invention is designed to alleviate these problems, and has for an object the provision of an economical system for collecting and removing non-magnetic materials in the form of used aluminum cans, glass bottles or the like, from areas where they have been deposited as waste or litter.

A further object of this invention is to provide a process for salvaging the reuseable non-magnetic materials, such as aluminum cans, so that such materials can be recycled into new products.

These and other objects and advantages of the present invention are achieved in the embodiment described herein by the provision of a process which includes assembling with the non-magnetic container a magnetically attractive material of sufficient size or quantity in relation to the weight of the container to enable the same to be moved or lifted by a magnetic field. A magnetic field, which may be generated for example by a portable electromagnet, is brought into the vicinity of the container such that it may be moved and deposited in a designated area, such as a suitable receptacle. The reuseable materials which are collected in this manner may then be separated from the non-reuseable magnetic materials, such as conventional "tin" cans, which may have also been deposited in the receptacle by the electromagnet.

Some of the objects and advantages of the invention having been stated, others will appear as the description proceeds, when taken in connection with the accompanying drawings, in which FIG. 1 is an exploded perspective view illustrating a method for assembling an arcuate wire of magnetically attractive material with an aluminum can;

FIG. 12 is a perspective view illustrating a method for traversing the borders of a roadway with a magnet to collect waste; and FIG. 13 is a perspective view illustrating a method for collecting reuseable materials from a moving belt carrying previously collected waste.

Figure 1:
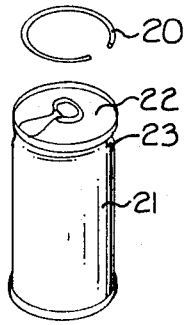
Figure 2:
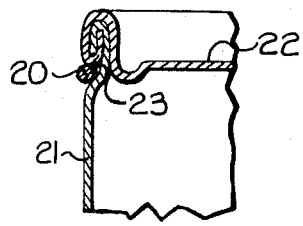
FIG. 2 is a fragmentary sectional view illustrating the can shown in FIG. 1, with the wire assembled thereto.

Referring specifically to the drawings, FIGS. 1 and 2 illustrate a method for assembling a magnetically attractive material in the form of an arcuate wire 20 to an aluminum can 21. In the embodiment shown, the aluminum lid 22 of the can is joined thereto by a connecting structure which defines an annular groove at 23 and which is adapted to closely receive and mount the ring 20. The ring 20 is dimensioned so as to be slightly sprung when positioned in the groove 23, such that the ring will be self-retained therein. It will be apparent that the groove 23 could be formed at another location along the height of the can, and that more than one groove and ring could be employed if desired.

Figures 3, 4:
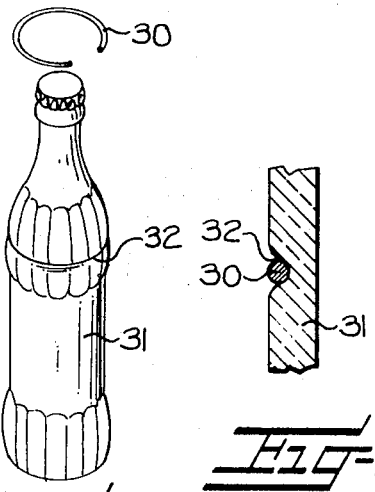
FIG. 3 is an exploded perspective view ilustrating a method for assembling an arcuate wire of magnetically attractive material to a glass bottle.
FIG. 4 is a fragmentary sectional view illustrating the bottle of FIG. 3, with the ring secured thereto.

FIGS. 3 and 4 illustrate a method for joining the ring 30 of magnetically attractive material to a glass bottle 31 having a peripheral groove 32 therein. This method is substantially similar to that disclosed in FIGS. 1 and 2.

Figure 5:
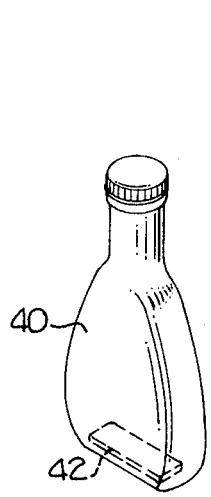
FIG. 5 is a perspective view of a plastic bottle having a magnetically attractive material integrally incorporated in the walls thereof.
Figures 6, 6A:
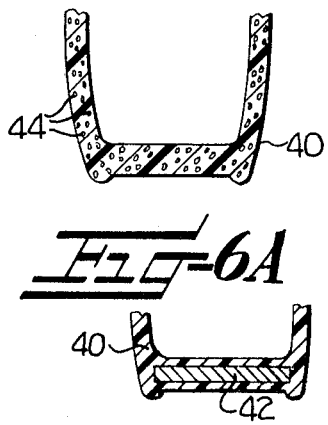
FIG. 6 is a fragmentary sectional view illustrating one method by which the magnetically attractive material may be incorporated in the bottle shown in FIG. 5.
FIG. 6A is a fragmentary perspective view similar to that shown in FIG. 6, but illustrating an alternate method by which the magnetically attractive material may be integrally assembled with the plastic bottle.

FIGS. 5 and 6 illustrate a plastic bottle 40 including an integrally incorporated strip of magnetically attractive material 42 molded in the base thereof. As an alternative to this construction, the magnetically attractive material may take the form of myriad discrete particles 44 evenly dispersed throughout the plastic material in the manner illustrated in FIG. 6A.

Figures 7, 8:
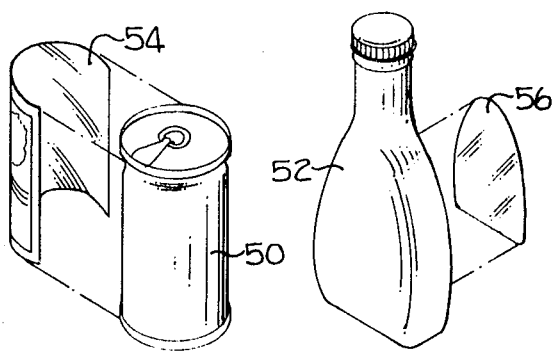
FIG. 7 is an exploded perspective view illustrating a method for assembling a label including a magnetically attractive material, to an aluminum can.
FIG. 8 is an exploded perspective view illustrating a method for assembling a label including a magnetically attractive material, to a plastic bottle.

FIGS. 7 and 8 illustrate an aluminum can 50 and plastic bottle 52 having labels 54 and 56, respectively, adhered thereto. In each case, the label comprises a sheet of flexible metallic foil having magnetically attractive properties and which may, if desired, include an overlying sheet of paper for strengthening the same.

Figures 9, 10:
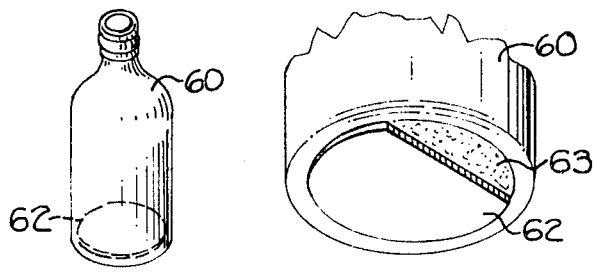
FIG. 9 is a perspective view of a glass bottle having a magnetically attractive material adhered to the base thereof.
FIG. 10 is a fragmentary perspective view, partly sectioned, illustrating the manner of adhering the magnetically attractive material to the bottle shown in FIG. 9.

The glass bottle 60 shown in FIGS. 9 and 10 has a magnetically attractive material in the form of a circular disc 62 secured to the bottom wall thereof by means of an adhesive 63.

Figure 11:
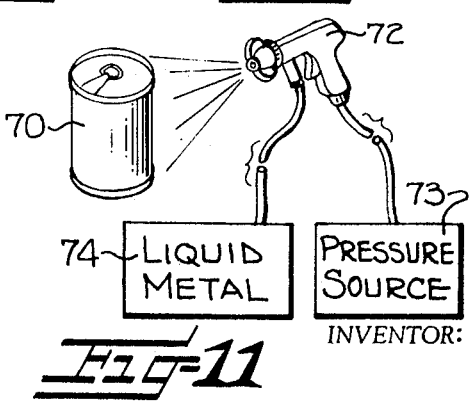
FIG. 11 is a schematic illustration of a process for spraying the outer periphery of an aluminum container with a self-adhering liquid metal having magnetically attractive properties.

FIG. 11 schematically illustrates a process for applying a self-adhering liquid or paint to the outer periphery of an aluminum can 70. The process utilizes a suitable spray gun 72 having an air pressure source 73, and a supply of liquid metal 74 or paint which includes discrete particles of a metal having magnetically attractive properties.

The magnetically attractive material utilized in the above illustrated embodiments of the present invention may comprise any number of suitable metallic materials or alloys, such as iron, steel, or alnico. Also, it will be appreciated that while a number of individual embodiments have been illustrated, one or more combinations of these embodiments may be applied to the single container in order to assure that there will be a sufficient quantity of the magnetically attractive material to enable an empty container to be moved or lifted by an appropriate magnetic field. For example, an aluminum can could have a metallic ring assembled therewith as shown in FIGS. 1 and 2, as well as a label comprising a magnetically attractive foil as shown in FIG. 7.

Once the magnetically attractive material has been assembled with the container as described above, it is contemplated by the present invention that the container will be sold, used by the consumer, and then deposited by him as litter in a public place such as along the borders of a roadway, or on a beach. To collect these containers, a portable magnet is employed to lift and deposit them in a suitable receptacle. Referring to the specific example shown in FIG. 12, a conventional electro-magnet 80 may be mounted to a truck 82 such that the magnet 80 may sweep or traverse the borders of a roadway as the truck moves to collect the containers. When the magnet 80 has collected a number of containers, it is moved to the position shown in dashed lines over the bed 84 of the truck, and the containers dropped thereinto by releasing the magnetic field.

It will be appreciated that the magnet will normally collect a number of magnetic articles, such as conventional "tin" cans, in addition to the non-magnetic containers described above. In many cases, it is desirable to separate the collected containers by classes of materials from which they are made such that selected materials may be recycled into new products. For example, since aluminum containers are relatively expensive, and may be easily recycled, it is contemplated that the aluminum containers collected may be separated, for example by hand, from the remaining non-reuseable materials.

As a further aspect of the present invention, reuseable materials may also be collected by the above process from areas such as landfills, waste disposal plants, or other depositories for collected waste, for subsequent recycling. In this case, a suitable magnet is traversed over the previously collected waste to gather the magnetically attractive materials, and such materials are then sorted to separate the reuseable materials from the non-reuseable materials. Referring specifically to FIG. 13, the magnet 90 is utilized to collect magnetically attractive materials from previously collected waste carried on belt 92, which may for example be located at a waste disposal plant. The collected materials are deposited in the receptacle at 94 for further sorting if desired.

In the drawings and specification, there have been set forth preferred embodiments of the invention, and although specific terms are employed, they are used in a generic and descriptive sense only and not for purposes of limitation.

I claim:

1. A process of collecting and reclaiming reuseable non-magnetic materials in the form of containers or the like, with which a magnetically attractive material of sufficient size in relation to the weight of the containers to enable the containers to be moved by a magnetic field has previously been assembled, from areas where such containers have been deposited as waste, said process comprising the steps of:

traversing the areas with a magnetic field of sufficient strength to attract and move the empty containers while collecting the containers within the magnetic field, and depositing the containers in a designated area by releasing the same from the magnetic field.

2. The process as defined in claim 1 comprising the further subsequent step of separating the collected containers by classes of materials from which they are made.

3. The process as defined in claim 2 wherein the areas where such containers have been deposited comprise the borders of roadways.

4. The process as defined in claim 2 wherein the areas where such containers have been deposited comprise depositories for collected waste.

5. A process for collecting non-magnetic containers in the form of empty glass or plastic bottles, aluminum cans, or the like, to facilitate refuse collection and removal from areas where such containers have been deposited as waste, comprising the steps of:

assembling with the containers a magnetically attractive material of sufficient size in relation to the weight of the containers to enable the same to be moved by a magnetic field, moving the containers by bringing a controlled magnetic field into the vicinity thereof, and depositing the same in a designated area by releasing the magnetic field when the container is deposited in such area.

6. The process as defined in claim 5 wherein the step of assembling a magnetically attractive material with the containers comprises securing the material to the outer periphery of the containers.

7. The process as defined in claim 5 wherein the step of assembling a magnetically attractive material with the containers comprises forming an annular groove about the periphery of the containers, and securing an arcuate, magnetically attractive wire in such groove.

8. The process as defined in claim 5 wherein the step of assembling a magnetically attractive material with the containers comprises fabricating a magnetically attractive material into a sheet of flexible foil, and adhering the sheet to the outer periphery of the containers.

9. The process as defined in claim 5 wherein the step of assembling a magnetically attractive material with the containers comprises incorporating the material integrally within the non-magnetic material.

10. The process as defined in claim 5 wherein the step of assembling a magnetically attractive material with the containers comprises spraying the outer periphery of the containers with an adhering liquid including discrete particles of a magnetically attractive material.

References Cited

UNITED STATES PATENTS 3,416,217   12/1968   Walker _____ 29—403

THOMAS H. EAGER, Primary Examiner

U.S. Cl. X.R.

29—200 A, 200 D, 211 M